(12) United States Patent
Shahidi et al.

(10) Patent No.: US 7,587,203 B2
(45) Date of Patent: Sep. 8, 2009

(54) FORWARD LINK ADMISSION CONTROL FOR HIGH-SPEED DATA NETWORKS

(75) Inventors: Reza Shahidi, San Diego, CA (US); Wanshi Chen, San Diego, CA (US); Rath Vannithamby, San Diego, CA (US); Keerthi Govind, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 819 days.

(21) Appl. No.: 11/255,048

(22) Filed: Oct. 20, 2005

(65) Prior Publication Data

US 2007/0091801 A1     Apr. 26, 2007

(51) Int. Cl.
*H04L 12/26* (2006.01)
*H04J 3/06* (2006.01)
*H04J 1/16* (2006.01)

(52) U.S. Cl. .................. 455/423; 370/230; 370/235; 370/252; 370/352; 370/519

(58) Field of Classification Search ................. 455/423; 370/230, 235, 252, 352, 519
See application file for complete search history.

(56) References Cited

U.S. PATENT DOCUMENTS

2007/0091801 A1*  4/2007  Shahidi et al. .............. 370/230

* cited by examiner

*Primary Examiner*—William D Cumming
(74) *Attorney, Agent, or Firm*—Coats & Bennett, P.L.L.C.

(57) ABSTRACT

Admission control is performed on a forward link shared packet data channel based on the measured delay per unit of data transmitted on the channel or the data throughput on the channel. In another embodiment, statistical analyses of channel quality metrics received at a base station are compared to the data rate used to serve mobile stations on the packet data channel to perform admission control. In any case, admission control may be performed for a new call setup request, hard handoff or virtual handoff. Admission control may be performed independently for a plurality of Quality of Service (QoS) flow categories, such as real time, best effort, rate sensitive, or QoS categories defined by cost. Users may be allocated among QoS flow categories as necessary to maintain performance.

53 Claims, 4 Drawing Sheets

FORWARD LINK ADMISSION CONTROL FOR HIGH-SPEED DATA NETWORKS

BACKGROUND

The present invention relates generally to the field of wireless communications and in particular to methods of forward link admission control.

The 3rd Generation (3G) wireless communication networks provide mobile users wireless access to packet data networks, such as the Internet. Many applications and services, once available only to users at fixed terminals, are now being made available via wireless communication networks to mobile users. Real-time streaming video and music, on-line interactive gaming, text messaging, email, web browsing and Voice over IP (VoIP), are just a few examples of data services now being provided via wireless networks to mobile users.

The demand for such wireless data services has led to the development of high speed packet data channels to provide the high data rates that such services require. High speed packet data channels are employed on the forward link in cdma2000 (both 1xEV-DV and 1x-EV-DO) and High Speed Downlink Packet Data Access (HSPDA) systems. The high speed packet data channel is a shared channel. In 1xEV-DV systems, the forward link packet data channel is known as the Forward Packet Data Channel (F-PDCH). Transmissions from a base station to the mobile stations are time-multiplexed and transmitted at full power. At any given time, the base station transmits to only one mobile station.

The slot times and data rates allocated for transmissions to the mobile stations depend on the channel conditions seen by each mobile station. The mobile stations measure the signal quality on the forward link and send channel quality information on the reverse link overhead channels to the base station. The channel quality information may comprise either a channel quality indicator (CQI) in 1xEV-DV and HSPDA, or a data rate indication (DRC) in 1xEV-DO. The base station selects a forward link data rate and assigns slot times for a mobile station based on the channel quality feedback from that mobile station. The base stations may also vary the modulation and encoding used for the forward link channel, depending on the channel conditions and/or the requested data rate.

The base station transmits to only one mobile station at a time on the forward link packet data channel(s). The mobile station is selected from a plurality of mobile stations requesting packet data according to a variety of criteria, such as round-robin, best reported channel quality, proportionate fair, and the like. In addition to determining to which mobile terminal, or user, to transmit data packets at any given time, or slot, the base station must also limit the number of users in the queue or pool of users requesting data. This is known as admission control.

Admission control maintains the required integrity of services provided by the wireless system. Admission control avoids instability which may occur if system resources are over-allocated. Generally, admission control algorithms attempt to maximize the number of simultaneous active users while protecting the system from overload.

In cdma2000 1x, the forward link admission control for the packet data channel was performed based on the available residual power. In 1xEV-DO Rev. 0, the forward link admission control was performed based on the residual time slots. The number of unused time slots, or percentage of time slots utilized gave some indication of the performance per user; this metric was used to perform admission control. 1xEV-DO Rev. A allows multi-user packets, wherein a plurality of small data packets—possibly addressed to different users—may be bundled into a single transmission packet. With multi-user packets, forward admission control cannot be performed based on the availability of time slots, as this metric no longer correlates with the number of users being served (i.e., the number of users in the pool awaiting transmission of data packets).

However, admission control must still be performed in 1xEV-DO Rev. A so that the available resources are not over-utilized. Over-utilizing resources results in poor integrity of calls. For example, real time applications will experience excessive delay and best effort applications will experience low throughput. In order to avoid poor integrity, the system must perform admission control. In general, admission control may be performed by identifying shared resources, and monitoring the allocation of shared resources, and the impact on the shared resources of admitting a new user.

SUMMARY

According to embodiments of the present invention, various metrics regarding data packet transmission on a packet data channel are used to perform forward admission control for the channel. In one embodiment, the measured delay per unit of data transmitted on the channel is defined as a shared channel resource, and admission control is performed based on the shared channel resource of delay per data unit.

In another embodiment, the throughput of data transmitted on the channel is defined as a shared channel resource, and admission control is performed based on the shared channel resource of data throughput.

In another embodiment, channel quality metrics (e.g., CQI) are received at a base station, and the data rate used to serve mobile stations on the packet data channel is ascertained. Admission control is performed based on a comparison of statistical values of the channel quality metrics to the actual data rate.

In all of these embodiments, admission control may be performed for a new call setup request, and/or by a target sector in a hard or a virtual handoff of a user from a source sector. Admission control may be performed independently for a plurality of Quality of Service (QoS) flow categories, such as real time, best effort, rate sensitive, or QoS flow categories defined by cost. Furthermore, admission control may be required when a new QoS flow category is added, and an existing call is added to the new QoS flow category. Users may be allocated among QoS flow categories as necessary to maintain performance. In some embodiments, admission control on a lower-priority QoS flow category will not affect performance on a high-priority QoS flow category; in other embodiments, QoS flow categories may exhibit a mutual impact of admission. In the latter case, the admission control performed for a first QoS flow category may additionally consider the impact on a second QoS flow category of adding a user to the first QoS flow category.

DETAILED DESCRIPTION

Figure 1:
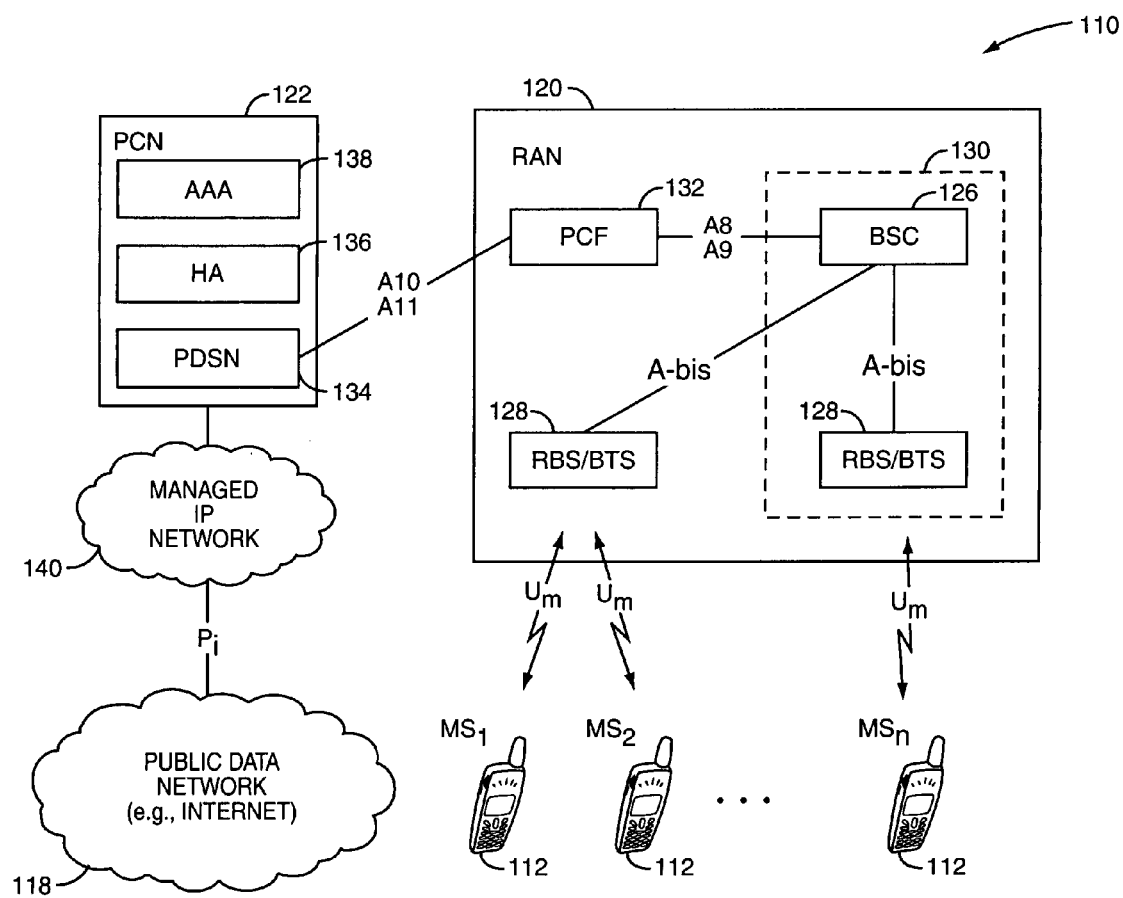
FIG. 1 is a block diagram of the packet data side of a wireless communication network.

FIG. 1 illustrates the packet data side of an exemplary wireless communication network generally referred to by the numeral 110. The wireless communication network 110 may be any type of wireless communication network, such as a CDMA network, WCDMA network, GSM/GPRS network, EDGE network, or UMTS network. In one exemplary embodiment, network 110 is based on cdma2000-1x standards as promulgated by the Telecommunications Industry Association (TIA), although the present invention is not limited to such implementations. Here, network 110 communicatively couples one or more mobile terminals 112 to a Public Data Network (PDN) 118, such as the Internet, by providing packet data communications over an air interface. In support of this functionality, the network 110 comprises a Radio Access Network (RAN) 120 connected to a Packet Core Network (PCN) 122.

The RAN 120 typically comprises one or more Base Station Controllers (BSCs) 126, each connected to one or more Radio Base Stations (RBS) 128 via an A-bis interface. Each RBS 128 (also known in the art as a Base Transceiver Station, or BTS) includes the transceiver resources (not shown) supporting radio communication with mobile terminals 112, such as modulators/demodulators, baseband processors, radio frequency (RF) power amplifiers, antennas, etc. The combination of a BSC 126 and a RBS/BTS 128 form a Base Station (BS) 130. Note that a given BSC 126 may be part of more than one BS 130. In operation, a BS 132 transmits packet data to mobile terminals 112 on forward link channels, and receives packet data from the mobile terminals 112 on reverse link channels.

The BSC 126 is communicatively coupled to the PCN 122 via a Packet Control Facility (PCF) 132. The BSC 126 connects to the PCF 132 over an A8 interface carrying user traffic and an A9 interface carrying signaling. The PCF 132 manages the buffering and relay of data packets between the BS 130 and the PCN 122. As those of skill in the art will recognize, the PCF 132 may be part of the BSC 126, or may comprise a separate network entity.

The PCN 122 comprises a Packet Data Serving Node (PDSN) 134, a Home Agent (HA) 136, and an Authentication, Authorization, and Accounting (AAA) server 138. The PCN 122 may couple to the PDN 118 through a managed IP network 140, which operates under the control of the network 110. The IP network 140 connects to the PDN 118 via a $P_i$ interface, or alternatively another industry standard packet data communication protocol, such as Transport Control Program/Internet Protocol (TCP/IP). Alternatively, the PCN 122 may couple directly to the PDN 118, such as the Internet.

The PDSN 134 provides packet routing services, maintaining routing tables and performing route discovery. The PSDN 134 additionally manages the Radio-Packet (R-P) interface and Point-to-Point Protocol (PPP) sessions for mobile users, assigning authenticated mobile terminals 112 an IP address from a pool of addresses. The PSDN 134 additionally frames data such as Broadcast/Multicast Services (BCMCS) media streams for transmission across the RAN to the BS 130 for transmission to one or more mobile terminals 112. The PSDN 134 also provides Foreign Agent (FA) functionality for registration and service of network visitors, and initiates authentication procedures with the AAA server 138. The PSDN is communicatively coupled to the PCF 132 via an A10 interface for user traffic and an A11 interface for signaling. HA 136 operates in conjunction with PDSN 134 to authenticate Mobile IP registrations and to maintain current location information in support of packet tunneling and other traffic redirection activities. The AAA server 138 provides authentication, authorization and accounting services for the PSDN 134.

As described above, the BS 130 performs admission control on users requesting packet data on a forward packet data channel, to ensure network integrity. The service request may result from a new call setup, a virtual handoff, a hard handoff, or the addition of a QoS flow category. The BS 130 may perform admission control on a per sector, per QoS flow category, or per link basis.

In one embodiment, the measured delay per unit of data transmitted is defined as a shared resource, and admission control is based on the shared resource of measured delay per data unit. In particular, admission control is performed based on the measured delay per data unit per QoS flow category per CDMA Channel (sector). For simplicity, assume that the data unit is an octet (although of course any data unit may be used, such as bit, packet, or the like). Each octet received at a base station in a given QoS flow category is served by a channel based on a priority defined in a scheduler. Admission control is performed to keep enough resources available to the scheduler so that the scheduler may maintain the required QoS.

Figure 2:
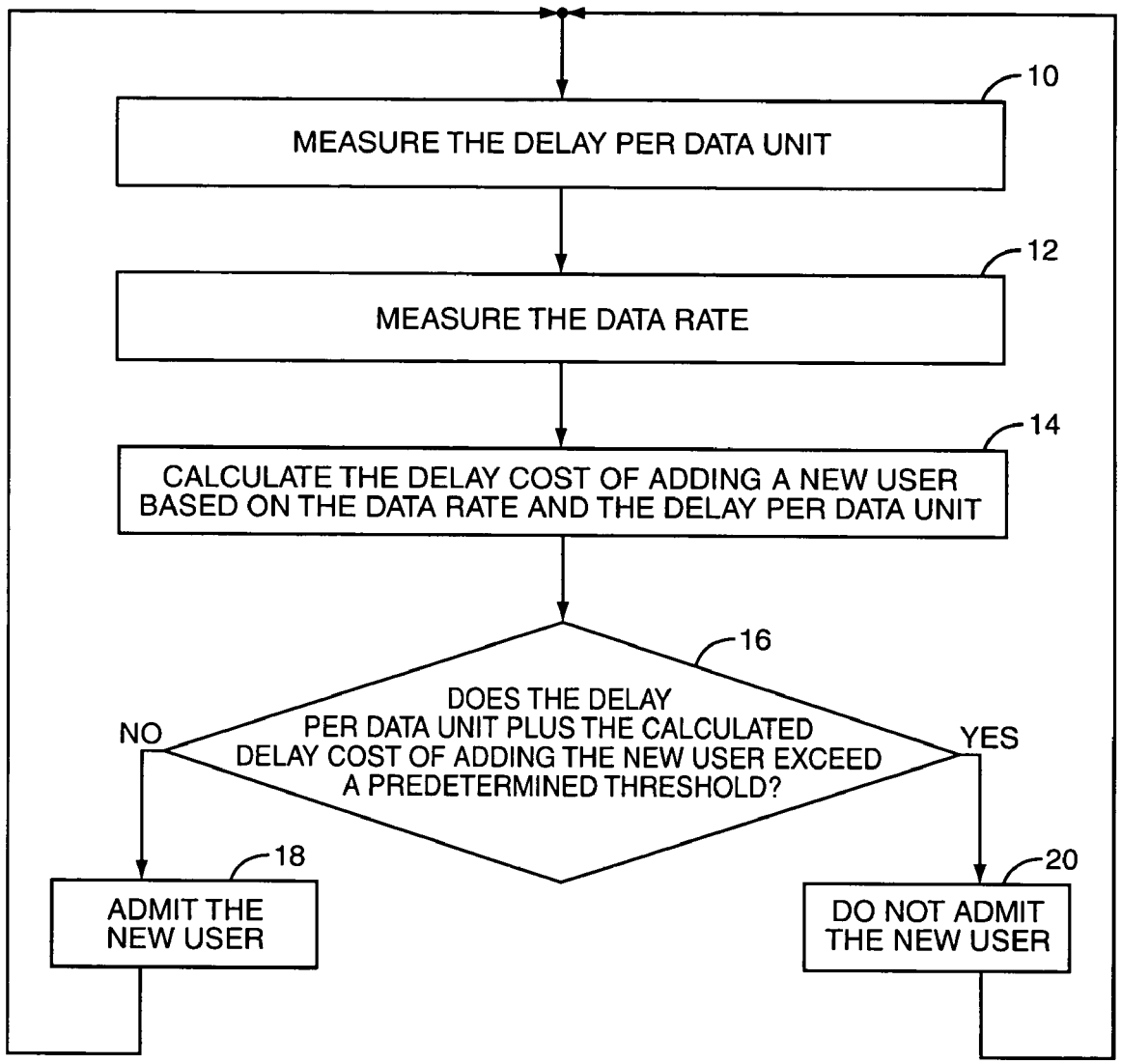
FIG. 2 is a flow diagram of admission control based on data unit delay.

A method of admission control based on delay per data unit is depicted in flow diagram form in FIG. 2. The delay is measured (block 10) from the time the octet is received at a base station 130 and placed in the transmission queue of the given QoS flow category (flow category_i), to the time the octet is transmitted and successfully acknowledged by the physical layer HARQ. Assume a per second delay, although of course any temporal unit may be used (e.g., 0.5 sec, 1 minute, 10 minutes, or the like). Let the measured delay per octet per QoS flow category be denoted by Delay_i. A QoS flow category may be delay sensitive, best effort, or rate sensitive. It may additionally have finer sub-categories based on user class. For each QoS flow category, an admission threshold is defined. The system may receive a resource request at call setup, at handoff, or when adding a new QoS flow category. Accordingly, a separate admission threshold may be defined per resource request type (call setup, virtual handoff, hard handoff) per QoS flow category.

In the following analysis, assume that a flow category with smaller index has a higher priority than a flow category with a larger index. In addition, the corresponding admission threshold is denoted as QoS flow category threshold_i (ResourceType) where ResourceType is either, call setup, virtual handoff, or hard handoff. In order to be able to predict the impact of a user to the measured delay per octet metric, the aggregate average number of octets served in a second for each QoS flow category is measured (block 12). The average aggregate number of octets per second is denoted as AvgAggregateOctetPerSecond_i.

The cost of adding a new connection is calculated (block 14) as:

$$\text{CostofNewConnection}\_i = [\text{AvgAggDataUnitsPerSec}\_i/\text{AvgDataUnitsPerSec(service)}]*\text{Delay}\_i$$

where AvgDataUnitsPerSec(service) is a fixed number for a given service and QoS combination.

The delay per data unit plus the calculated delay cost of adding a new user is then calculated, and compared to a threshold (block 16). A new user is added (block 18) if:

$$\text{Delay}\_i + \text{CostofNewConnection}\_i <= \text{QoSFlowCategoryThreshold}\_i(\text{ResourceType})$$

where ResourceType is either call setup, virtual handoff, or hard handoff, and where QoSFlowCategoryThreshold_i(ResourceType) is a predetermined value for QoS flow category i and each ResourceType.

If this equation is not satisfied, the new user is not added (block 20).

Generally, adding a new user to a higher priority QoS flow category impacts the performance of a lower priority QoS flow category. Therefore, this admission control algorithm may advantageously be implemented together with a congestion control mechanism that monitors the performance of each QoS flow category. If the target QoS for a given flow category cannot be maintained, one or more users should be demoted to a lower QoS flow category, or disconnected, by the congestion control. This observation assumes that the higher priority QoS flow category has also higher priority in receiving service. If the grade of service follows different priority than QoS, the above admission criterion may have to be changed.

This embodiment uses the shared resource of data unit delay in 1xEV-DO Rev A to perform admission control, and it is independent of how the scheduler works. The impacts of the scheduler are observed in the metric and the admission decision is made accordingly.

The above discussion assumes that the scheduler decouples the higher priority QoS flow categories from the lower priority ones. As a result, admission to a low priority QoS flow category will not impact the delay performance experienced by a higher priority QoS flow category, and there is no need to predict the impact of low priority Qos flow category admission on the higher priority QoS flow categories. On the other hand, although admission of a high priority QoS flow category will impact low priority QoS flow categories, mechanisms such as congestion control may be used to address these issues.

However, the above assumption may not be true for certain schedulers. In this case, the admission control must predict the impact of each QoS flow category on all other QoS flow categories that may be impacted due to scheduler coupling. In general, this impact needs to be taken into account for higher priority QoS flow categories only and the impact to the lower priority QoS flow categories may be handled by congestion control.

This can be solved by considering the mutual impact of QoS flow category admissions. Below is one realization of such algorithms. Consider a set M of QoS flow categories. Consider the QoS flow category j∈M requesting to be added. The admission to QoS flow category j may impact a set of QoS flow categories A ⊆ M. Note that j∈ A. To perform admission control on QoS flow category j, the following condition must be satisfied: For ∀n∈A, Delay_$n$+C($n,j$)*CostOfNewConnection$j$_
    $j$<=FlowCategoryThreshold_$n$(ResourceType)

Where C(n,j) is the correction factor for the cost of addition of QoS flow category j to QoS flow category n, which depends on the scheduler design. For example, C(n,j)=1 when n=j. If the scheduler decouples the high priority QoS flow categories from the low priority QoS flow categories, C(n, j)=0 for n<j as discussed above. Otherwise, it should be a number smaller than 1.

The cost function may be a nonlinear function of the QoS flow category pair delay measurement. Its realization depends on the scheduler.

Although prediction is assumed, admission control may be performed without prediction, i.e., by comparison of the current measured data unit delay against the corresponding threshold. Here again, the mutual impact may be considered when necessary.

In measuring the delay, it may become necessary to exclude or deemphasize the users whose channel conditions cannot support the desired rate. The desired rate can be derived from the QoS requirements. For example, consider a user in bad channel conditions. Even if the user can be scheduled for transmission all the time, its QoS still cannot be satisfied, and the measured delay for this user may be very large. However, new requests may still be advantageously admitted in the same QoS flow category in light of the channel conditions experienced by the existing users.

The above embodiment utilizes separate thresholds for different QoS flow categories. However, admission control can be simplified to one threshold per one or more connection types by normalizing the measured (or predicted) delays against the corresponding thresholds and aggregating into one value using some combinations. This simplification reduces the number of configurations at the expense of flexibility.

In another embodiment, the average data throughput per sector (or per QoS flow category or per link) is defined as a shared resource, and admission control is performed based on the shared resource of data throughput. Different thresholds may be specified for new call, a soft/softer handoff call, and QoS flow category addition to an existing call. The average sector throughput, average throughput per link, or average throughputs per QoS flow category do not say much about loading, channel condition or the traffic types of the existing connection. However, it is possible to define different admission thresholds based on the scheduling algorithm used in the BTS/Scheduler.

Figure 3:
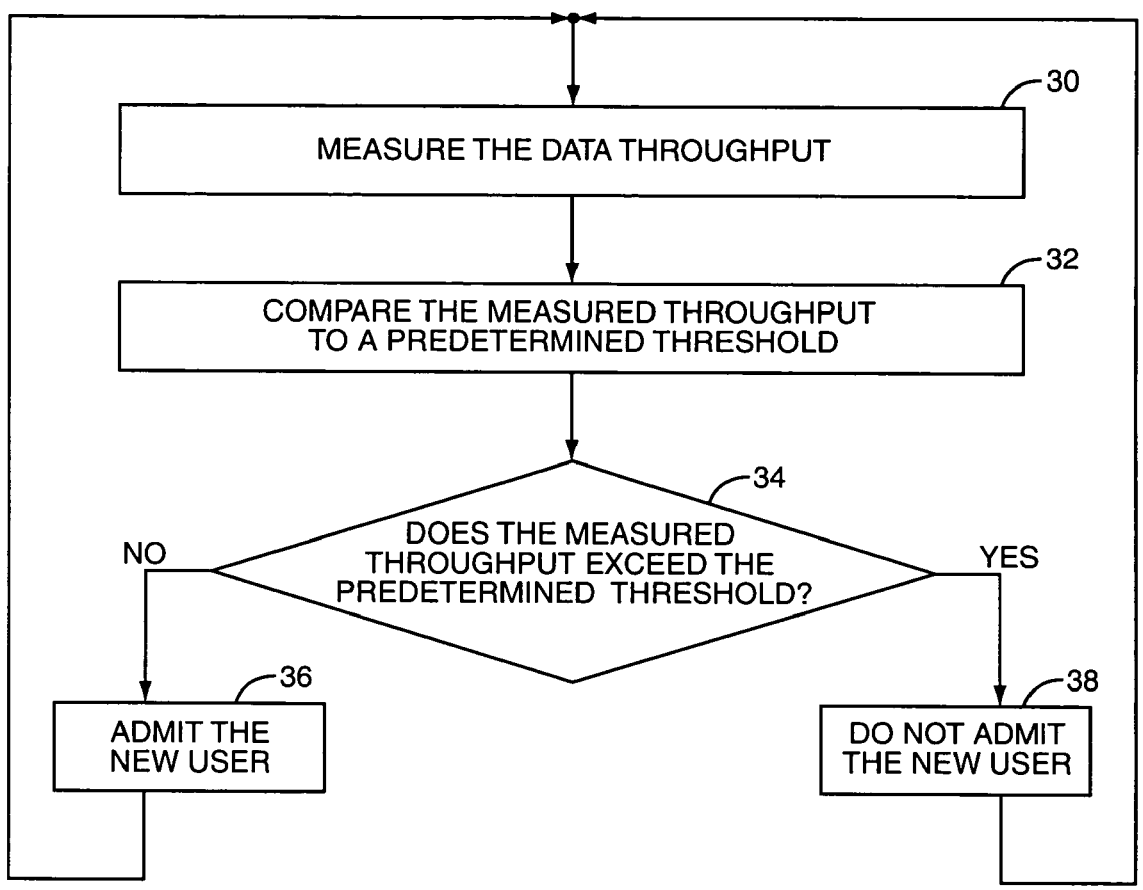
FIG. 3 is a flow diagram of admission control based on data throughput.

A method of performing admission control according to this embodiment is depicted in flow diagram form in FIG. 3. The relevant data throughput is measured (block 30) and compared to a predetermined threshold (block 32). If the measured throughput exceeds the threshold (block 34), a new user is admitted (block 36). If the measured throughput falls below the threshold (block 34), the system may be defined to be in congested state, and new users are not admitted (block 38). To alleviate the congested state, the system may employ mechanisms such as dropping certain QoS flow categories or calls, based on: (1) a priority level associated with the QoS provisioning of the calls, or (2) channel condition of certain calls. For example, the call with the worst channel conditions may be dropped first. Alternatively, the QoS provisioning of the existing call may be degraded.

Figure 4:
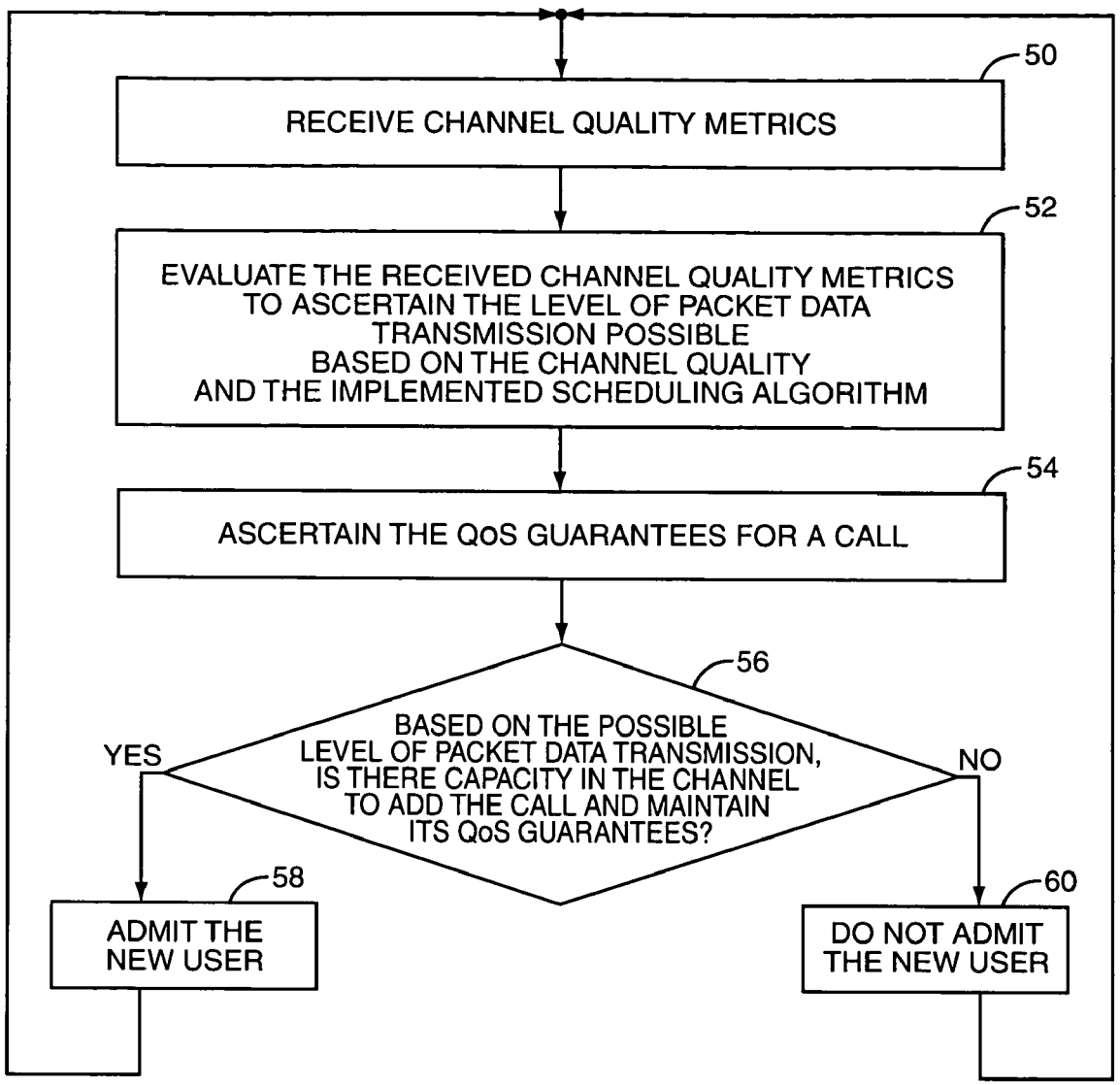
FIG. 4 is a flow diagram of admission control based on a comparison of statistical values of channel quality to the data rate.

In another embodiment, depicted in flow diagram form in FIG. 4, admission control is performed based on an analysis of channel quality metrics. Mobile terminals 112 report channel quality metrics to the base station 130. For example, in 1xEV-DO, the mobile terminals 112 send Dynamic Rate Change (DRC) indices to the base station 130 to select a packet data rate. In 1xEV-DV, the mobile terminals 112 send Channel Quality Indicator (CQI) signals to the base station 130. In other systems, the specific channel quality may vary. Whatever form they take, the channel quality metrics are received at the base station 130 (block 50).

The received channel quality metrics (e.g., DRC or COI) evaluated, such as through statistical analysis (mean, variance, and the like). The channel quality metrics may be filtered prior to performing the analysis. The level of packet data transmission possible is then ascertained, based on the statistical values of channel quality and the scheduling algorithm implemented for the channel at the base station 130 (block 52). This determines how much extra capacity is in the channel, or alternatively, how overloaded the channel is.

The QoS guarantees for the call are then ascertained (block 54). For a new call request, the QoS negotiation is part of the call setup; for new calls from virtual or hard handoff, the QoS guarantees are exchanged as part of the handoff signaling.

Admission control is then performed for the call by comparing the possible level of packet data transmission to the call's QoS guarantees (block 56). If the channel (or QoS flow category if admission control is performed on a per-QoS flow category basis), can accommodate the call and maintain the required QoS, the call is admitted (block 58). Otherwise, it is not (block 60).

Various thresholds on the channel quality metrics mentioned above can be used for admission and congestion. It is also possible to look at a weighted metric based on the QoS performance required by the individual user or QoS flow category instead of the average metric in both of the above cases.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of performing admission control for a forward link shared packet data channel in a wireless communication system, comprising:
measuring a channel property selected from the group consisting of delay per unit of data transmitted, channel throughput, and statistical values of the channel quality metric received from mobile terminals; and
performing admission control based on the calculated impact of adding a new user to the channel on the selected channel property.

2. A wireless communication network, comprising:
a plurality of mobile stations; and
a base station transmitting packet data to one or more mobile stations on a forward link shared packet data channel, the base station operative to perform admission control by measuring a channel property selected from the group consisting of delay per unit of data transmitted, channel throughput, and statistical values of the channel quality metric received from mobile terminals, and comparing the measured channel property to a predetermined threshold.

3. The network of claim 2 wherein the base station is operative to perform admission control for a new call setup request.

4. The network of claim 2 wherein the base station is operative to perform admission control by a target sector in a virtual handoff of a user from a source sector.

5. The network of claim 2 wherein the base station is operative to perform admission control by a target sector in a hard handoff of a user from a source sector.

6. The network of claim 2 wherein the base station is operative to perform admission control for a plurality of Quality of Service (QoS) flow categories.

7. The network of claim 2 wherein the base station is further operative to monitor performance of the plurality of QoS flow categories, and to allocate users among QoS categories as necessary to maintain performance.

8. The method of claim 1 wherein the channel property selected is the measured delay per unit of data transmitted on the channel, and wherein performing admission control based on the calculated impact of adding a new user to the channel on the selected channel property comprises performing admission control based on the shared channel resource of delay per data unit.

9. The method of claim 1, wherein performing admission control based on the shared channel resource of delay per data unit comprises:
measuring the delay per data unit for the channel;
measuring the data rate for the channel;
calculating the delay cost of adding a new user to the channel based on the data rate and the delay per data unit for the channel; and
admitting the new user to the channel only if the delay per data unit for the channel plus the calculated delay cost of adding the new user does not exceed a predetermined threshold.

10. The method of claim 9 wherein the admission control is performed for a new call setup request.

11. The method of claim 9 wherein the admission control is performed by a target sector in a virtual handoff of a user from a source sector.

12. The method of claim 9 wherein the admission control is performed by a target sector in a hard handoff of a user from a source sector.

13. The method of claim 9 wherein the admission control is performed when a new Quality of Service (QoS) flow category is added, and an existing call is added to the new QoS flow category.

14. The method of claim 9 wherein the admission control is performed for a plurality of QoS flow categories.

15. The method of claim 14 wherein one QoS flow category on which admission control is performed is real time.

16. The method of claim 14 wherein one QoS flow category on which admission control is performed is best effort.

17. The method of claim 14 wherein one QoS flow category on which admission control is performed is rate sensitive.

18. The method of claim 14 wherein one or more QoS flow categories are defined by a premium charged for their access.

19. The method of claim 14 further comprising monitoring performance of the plurality of QoS flow categories, and allocating users among QoS categories as necessary to maintain performance.

20. The method of claim 14 wherein the plurality of QoS flow categories are ranked by priority, and wherein admitting users to lower priority flow categories does not impact admission control for higher priority flow categories.

21. The method of claim 14 wherein at least first and second QoS flow categories in the plurality exhibit a mutual impact of admission, and wherein the decision to admit a new user to the first QoS flow category depends on both the calculated delay cost to the first QoS flow category and a calculated delay cost to the second QoS flow category, of adding the new user to the first QoS flow category.

22. The method of claim 14, wherein each QoS flow category is associated with a unique unit delay threshold against which measured delay plus calculated delay cost is compared to determine whether new users are admitted to the flow category.

23. The method of claim 14 wherein a single delay threshold is calculated by normalizing measured delays for each QoS flow category against corresponding category thresholds and aggregating the normalized delays.

24. The method of claim 9 wherein the admission control is performed for a plurality of QoS flow categories and resource types, and wherein measuring the delay per data unit for the channel comprises measuring the value Delay_i as the time delay of a data unit from entering the transmission queue of QoS flow category i to acknowledgement of successful transmission of the data unit.

25. The method of claim 24 wherein measuring the data rate for the channel comprises measuring the value of AvgAggDataUnitsPerSec_i as the average aggregate number of data units transmitted per second for the QoS flow category i.

26. The method of claim 25 wherein calculating the delay cost of adding a new user to the channel based on the data rate and the delay per data unit for the channel comprises calculating the delay cost per QoS flow category i according to CostofNewConnection_i=[AvgAggDataUnitsPerSec_i/AvgDataUnitsPerSec(service)]*Delay_i, where AvgDataUnitsPerSec(service) is a fixed number for a given service and QoS combination.

27. The method of claim 26 wherein admitting the new user to the channel only if the delay per data unit for the channel plus the calculated delay cost of adding the new user does not exceed a predetermined threshold comprises admitting the user if Delay_i+CostofNewConnection_i>=QoSFlowCategoryThreshold_i(ResourceType)

where ResourceType is selected from the group consisting of call setup, virtual handoff, and hard handoff, and where QoSFlowCategoryThreshold_i(ResourceType) is a predetermined value for QoS flow category i and each ResourceType.

28. The method of claim 27 wherein, for QoS flow categories n and j that exhibit a mutual impact of admission, a new user is admitted to flow category j only if Delay_n+C(n,j)*CostOfNewConnection_j>=FlowCategoryThreshold_n(ResourceType)

where
Delay_n is the time delay of a data unit from entering the transmission queue of QoS flow category n to acknowledgement of successful transmission of the data unit;
CostOfNewConnection_j is the calculated delay cost of adding a new user to QoS flow category based on the data rate and the delay per data unit for flow category j;
FlowCategoryThreshold_n is a predetermined value for QoS flow category n and each ResourceType; and
C(n,j) is a correction factor reflecting the impact to flow category n of adding a new user to flow category j.

29. The method of claim 9 wherein performing admission control based on the shared channel resource of delay per data unit comprises:
measuring the delay per data unit for the channel; and
admitting the new user to the channel only if the measured delay per data unit for the channel does not exceed a predetermined threshold.

30. The method of claim 1 wherein the channel property selected is the throughput of data transmitted on the channel, and wherein performing admission control based on the calculated impact of adding a new user to the channel on the selected channel property comprises performing admission control based on the shared channel resource of data throughput.

31. The method of claim 30, wherein performing admission control based on the shared channel resource of data throughput comprises:
measuring the data throughput for the channel;
comparing the measured throughput to a predetermined threshold; and
admitting the new user to the channel only if the measured throughput exceeds the predetermined threshold.

32. The method of claim 31 wherein the admission control is performed for a new call setup request.

33. The method of claim 31 wherein the admission control is performed by a target sector in a virtual handoff of a user from a source sector.

34. The method of claim 31 wherein the admission control is performed by a target sector in a hard handoff of a user from a source sector.

35. The method of claim 31 wherein the admission control is performed when a new Quality of Service (QoS) flow category is added, and an existing call is added to the new QoS flow category.

36. The method of claim 31 wherein the admission control is performed based on the throughput of all channels in a sector.

37. The method of claim 31 wherein the admission control is performed for a plurality of Quality of Service (QoS) flow categories.

38. The method of claim 37 further comprising monitoring performance of the plurality of QoS flow categories, and allocating users among QoS categories as necessary to maintain performance.

39. The method of claim 37 wherein the plurality of QoS flow categories are ranked by priority, and wherein admitting users to lower priority flow categories does not impact admission control for higher priority flow categories.

40. The method of claim 37 wherein at least first and second QoS flow categories in the plurality exhibit a mutual impact of admission, and wherein the decision to admit a new user to the first QoS flow category depends on both the calculated throughput degradation to the first QoS flow category and a calculated throughput degradation to the second QoS flow category, of adding the new user to the first QoS flow category.

41. The method of claim 31 wherein the predetermined threshold is based on a scheduling algorithm used to schedule traffic on the channel.

42. The method of claim 1, further comprising:
receiving channel quality metrics at a base station;
evaluating the received channel quality metrics to ascertain the level of packet data transmission possible based on the channel quality and the implemented scheduling algorithm, and
ascertaining Quality of Service (QoS) guarantees for a call;
wherein the channel property selected is the statistical value of the channel quality metric received from mobile terminals; and
wherein performing admission control based on the calculated impact of adding a new user to the channel on the selected channel property comprises performing admission control on the call based on the possible level of packet data transmission and the QoS guarantees for the call.

43. The method of claim 42 wherein the channel quality metrics comprise Channel Quality Indicator (CQI) signals sent by a plurality of mobile terminals receiving data on the channel.

44. The method of claim 42 wherein the channel quality metrics comprise Dynamic Rate Change (DRC) signals sent by a plurality of mobile terminals receiving data on the channel.

45. The method of claim 42 wherein evaluating the received channel quality metrics comprises performing statistical analysis on the received channel quality metrics.

46. The method of claim 42 wherein the call is a new call setup request and wherein ascertaining QoS guarantees for the call comprises negotiating the QoS guarantees.

47. The method of claim 42 wherein the call is a virtual handoff of a user from a source sector.

48. The method of claim 42 wherein the call is a hard handoff of a user from a source sector.

49. The method of claim 42 wherein the call is an existing call being added to a new QoS flow category.

50. The method of claim 42 wherein the admission control is performed for a plurality of QoS flow categories.

51. The method of claim 50 further comprising monitoring performance of the plurality of QoS flow categories, and allocating users among QoS categories as necessary to maintain performance.

52. The method of claim 50 wherein the plurality of QoS flow categories are ranked by priority, and wherein admitting users to lower priority flow categories does not impact admission control for higher priority flow categories.

53. The method of claim 50 wherein at least first and second QoS flow categories in the plurality exhibit a mutual impact of admission, and wherein the decision to admit a new user to the first QoS flow category depends on both the calculated throughput degradation to the first QoS flow category and a calculated throughput degradation to the second QoS flow category, of adding the new user to the first QoS flow category.

* * * * *

UNITED STATES PATENT AND TRADEMARK OFFICE
CERTIFICATE OF CORRECTION

PATENT NO. : 7,587,203 B2  Page 1 of 1
APPLICATION NO. : 11/255048
DATED : September 8, 2009
INVENTOR(S) : Shahidi et al.

It is certified that error appears in the above-identified patent and that said Letters Patent is hereby corrected as shown below:

In Column 1, Line 24, delete "(HSPDA)" and insert -- (HSDPA) --, therefor.

In Column 1, Line 37, delete "HSPDA," and insert -- HSDPA, --, therefor.

In Column 3, Line 52, delete "PSDN" and insert -- PDSN --, therefor.

In Column 3, Line 56, delete "PSDN" and insert -- PDSN --, therefor.

In Column 3, Line 59, delete "PSDN" and insert -- PDSN --, therefor.

In Column 3, Line 62, delete "PSDN" and insert -- PDSN --, therefor.

In Column 4, Line 2, delete "PSDN" and insert -- PDSN --, therefor.

In Column 5, Line 31, delete "Qos" and insert -- QoS --, therefor.

In Column 5, Lines 53-54, delete "CostOfNewConnectionj_j" and insert -- CostOfNewConnection_j --, therefor.

In Column 6, Line 61, delete "COI)" and insert -- CQI) --, therefor.

In Column 9, Line 29, in Claim 27, delete "i>=" and insert -- i<= --, therefor.

In Column 9, Line 41, in Claim 28, delete "j>=" and insert -- j<= --, therefor.

In Column 9, Line 47, in Claim 28, delete "category" and insert -- category j --, therefor.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,587,203 B2
APPLICATION NO. : 11/255048
DATED : September 8, 2009
INVENTOR(S) : Shahidi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Twenty-first Day of September, 2010

David J. Kappos
*Director of the United States Patent and Trademark Office*